US007866977B2

(12) United States Patent
Von Blücher et al.

(10) Patent No.: US 7,866,977 B2
(45) Date of Patent: Jan. 11, 2011

(54) ROTARY TUBULAR KILN FOR THE PRODUCTION OF ACTIVATED CHARCOAL

(75) Inventors: Hasso Von Blücher, Erkrath (DE); Torsten Weber, Leichlingen (DE)

(73) Assignee: Blucher GmbH, Erkrath (DE)

( * ) Notice: Subject to any disclaimer, the term of this patent is extended or adjusted under 35 U.S.C. 154(b) by 1118 days.

(21) Appl. No.: 11/494,110

(22) Filed: Jul. 27, 2006

(65) Prior Publication Data

US 2007/0031772 A1 Feb. 8, 2007

(30) Foreign Application Priority Data

Jul. 28, 2005 (DE) ....................... 10 2005 035 907
Aug. 1, 2005 (DE) ....................... 10 2005 036 607

(51) Int. Cl.
*C01B 33/26* (2006.01)
*B01J 19/18* (2006.01)
*B23K 3/02* (2006.01)

(52) U.S. Cl. ........................ 432/118; 422/136; 110/226

(58) Field of Classification Search ....................... None
See application file for complete search history.

(56) References Cited

U.S. PATENT DOCUMENTS

| | | | |
|---|---|---|---|
| 2,057,526 A | 10/1936 | Horton | 263/22 |
| 2,721,069 A * | 10/1955 | Old et al. | 106/457 |
| 2,939,693 A * | 6/1960 | Old et al. | 432/13 |
| 3,386,719 A | 6/1968 | Martin | 263/34 |
| 4,317,291 A | 3/1982 | Weststrate et al. | 34/103 |
| 4,597,737 A | 7/1986 | Raghavan et al. | 432/197 |
| 4,725,350 A * | 2/1988 | Smith | 208/408 |
| 4,961,588 A * | 10/1990 | Brienza | 277/545 |
| 5,040,973 A * | 8/1991 | Matter et al. | 432/103 |
| 5,551,870 A * | 9/1996 | Gale | 432/115 |
| 7,172,414 B2 | 2/2007 | Von Blucher | 432/118 |
| 7,354,266 B2 * | 4/2008 | Miller et al. | 432/118 |
| 2001/0002308 A1 | 5/2001 | Schleiffer et al. | 432/75 |
| 2006/0169857 A1 * | 8/2006 | Hawkins et al. | 248/274.1 |
| 2007/0031772 A1 | 2/2007 | Von Blucher | 432/118 |

FOREIGN PATENT DOCUMENTS

| | | | |
|---|---|---|---|
| DE | 423 492 | 1/1926 | 80/11 |
| DE | 2 325 781 | 11/1974 | |
| DE | 10 2004 036 109 A1 | 2/2006 | |
| DE | 20 2005 015 318 | 10/2006 | |
| GB | 263630 | 1/1927 | |

* cited by examiner

*Primary Examiner*—Melvin C Mayes
*Assistant Examiner*—Sheng H Davis
(74) *Attorney, Agent, or Firm*—Woodard, Emhardt, Moriarty, McNett & Henry LLP

(57) ABSTRACT

The subject of the invention is a rotary tube (1), in particular for a rotary tubular kiln for the production of activated charcoal, according to the invention the rotary tube (1) being provided on its outside with at least one reinforcing element (8) for stabilizing the rotary tube (1) in the operating state. As a result, the rotary tube (1) exposed under operating conditions to high temperatures and consequently easily deformable is stabilized in its cross section and/or in its longitudinal direction, depending on the arrangement of the reinforcing element. In particular, the rotary tube (1), for example when it is used for the production of activated charcoal, with the accompanying high operating temperatures, is equipped with efficient resistance to pronounced pressure fluctuations occurring due to the method employed and is therefore also suitable, in particular, for carrying out processes under reduced or increased pressure.

18 Claims, 3 Drawing Sheets

ROTARY TUBULAR KILN FOR THE PRODUCTION OF ACTIVATED CHARCOAL

CROSS-REFERENCES TO RELATED APPLICATIONS

This application claims priority to German Patent Application No. DE 10 2005 035 907.8, filed Jul. 28, 2005, and also to German Patent Application No. DE 10 2005 036.607.4, filed Aug. 1, 2005, both entitled "ROTARY TUBULAR KILN FOR THE PRODUCTION OF ACTIVATED CHARCOAL". These references are expressly incorporated by reference herein, in their entirety.

BACKGROUND OF THE INVENTION

The present invention relates to a rotary tube, in particular for a rotary tubular kiln (furnace) for the production of activated charcoal (=activated carbon) and to a rotary tubular kiln having such a rotary tube. The present invention relates, furthermore, to the use of this rotary tube or rotary tubular kiln for the production of activated charcoal.

Activated charcoal, because of its highly unspecific adsorptive properties, is the absorbent which is used the most. Statutory conditions, but also the increasing awareness of responsibility for the environment, lead to a growing demand for activated charcoal.

In this context, activated charcoal is used increasingly both in the civil and in the military sector. In the civil sector, activated charcoal is employed, for example, for the upgrading of gases, filter systems for air-conditioning, autofilters, etc., whilst, in the military sector, activated charcoal is employed in protective materials of all kinds (for example, respirators, protective covers and protective garments of all kinds, such as, for example, protective suits, etc.)

Activated charcoal is generally obtained by the carbonization (also designated synonymously as smouldering, pyrolysis or coking) and subsequent activation of suitable carbon-containing (i.e. carbonaceous) starting materials. In this context, those starting materials are preferred which lead to economically reasonable outputs. This is because the weight losses due to the removal of volatile constituents during carbonization and due to burn-up during activation are considerable. For further details regarding the production of activated charcoal, reference may be made, for example, to H. v. Kienle and E. Bäder, Aktivkohle und ihre industrielle Anwendung [Activated charcoal and its industrial use], Enke Verlag Stuttgart, 1980.

The quality of the activated charcoal produced, fine-pored or coarse-pored, solid or fragmentary, etc., depends on the carbon-containing starting material. Conventional starting materials are, for example, coconut shells, wood waste, peat, hard coal, pitches, but also particular plastics, such as, for example, sulphonated polymers, which play an important part, inter alia, in the production of activated charcoal in the form of granules or spherules.

Activated charcoal is used in various forms: powdered charcoal, splintered charcoal, granulated charcoal, formed charcoal and, since the end of the 1970s, also granular and spherical activated charcoal (what is known as "granular charcoal" and "spherical charcoal"). Granular, in particular spherical activated charcoal has, as compared with other forms of activated charcoal, such as powdered charcoal, splintered charcoal and the like, a series of advantages which makes it useful or even indispensable for specific applications: it is pourable, exceedingly abrasion-resistant and dust-free and very hard. Granular charcoal, in particular spherical charcoal, because of its special form, but also because of the extremely high abrasion resistance, is highly sought after for special areas of use, such as, for example, surface filter materials for protective suits against chemical toxins or filters for low pollutant concentrations in large air quantities.

The production of activated charcoal, in particular granular charcoal and spherical charcoal, is in most cases based on suitable polymers. Sulphonated polymers, in particular sulphonated styrene polymers cross-linked with divinylbenzene, are preferably used, in which case sulphonation can be achieved even in situ in the presence of sulphuric acid or fuming sulphuric acid. Suitable starting materials are, for example, ion exchanger resins or their precursors, which are mostly polystyrene resins cross-linked with divinylbenzene, the sulphonic acid groups already being present in the material in the case of finished ion exchangers and still having to be introduced by sulphonation in the case of ion exchanger precursors. The sulphonic acid groups perform a critical function, since they assume the role of a cross-linking agent in that they are removed during carbonization. However, in particular, the large quantities of sulphur dioxide released and the corrosion problems in the production equipment which are associated, inter alia, with these are disadvantageous and present difficulties.

The production of activated charcoal conventionally takes place in rotary tubular kilns. These have, for example, a feed point for charging the raw material at the kiln start and a discharge point for the final product at the kiln end.

In the conventional processes for the production of activated charcoal according to the prior art, both carbonization and subsequent activation are carried out in discontinuous production in a rotary tube.

In carbonization, which may be preceded by a pre-carbonization or pre-smouldering phase, the conversion of the carbon-containing starting material into carbon takes place, that is to say, in other words, the starting material is carbonized. During the carbonization of the abovementioned organic polymers based on styrene and divinylbenzene, which contain cross-linking functional chemical groups, leading in the event of their thermal decomposition to free radicals and therefore to crosslinkages, in particular sulphonic acid groups, the functional chemical groups, in particular sulphonic acid groups, are destroyed, at the same time as the removal of volatile constituents, such as, in particular, $SO_2$, and free radicals are formed, which bring about high crosslinking, without there being any pyrolysis residue (=carbon). Suitable starting polymers of the above-mentioned type are, in particular, ion exchanger resins (for example, cation exchanger resins or acid ion exchanger resins, preferably with sulphonic acid groups, such as, for example, cation exchanger resins based on sulphonated styrene divinylbenzene copolymers) or their precursors (that is to say, the unsulphonated ion exchanger resins which still have to be sulphonated before or during carbonization by means of a suitable sulphonating agent, such as, for example, sulphuric acid and/or fuming sulphuric acid). In general, pyrolysis is carried out under an inert atmosphere (for example, nitrogen) or an at most slightly oxidizing atmosphere. It may likewise be advantageous, during carbonization, particularly at higher temperatures (for example, in the range of about 500° C. to 650° C.), to add a relatively small quantity of oxygen, particularly in the form of air (for example, 1 to 5%), to the inert atmosphere, in order to bring about an oxidation of the carbonized polymer skeleton and thereby facilitate subsequent activation.

On account of the acid reaction products (for example, $SO_2$) removed during carbonization, this step in the process of producing the activated charcoal is extremely corrosive in terms of the kiln material and makes the most stringent demands as regards the corrosion resistance of the material of the rotary tubular kiln.

Carbonization is then followed by the activation of the carbonized starting material. The basic principle of activation is to break down part of the carbon generated during smouldering selectively and in a controlled manner under suitable conditions. This gives rise to numerous pores, splits and cracks, and the activated charcoal surface related to the unit of mass increases considerably. During activation, therefore, a controlled burn-up of the charcoal is carried out. Since carbon is broken down during activation, in this process a considerable loss of substance occurs in parts, which, under optimum conditions, is equivalent to a rise in porosity and signifies an increase in the inner surface (pore volume) of the activated charcoal. Activation therefore takes place under selectively or controlledly oxidizing conditions. Conventional activation gases are generally oxygen, in particular in the form of air, steam and/or carbon dioxide and also mixtures of these activation gases. Inert gases (for example, nitrogen) may be added, if appropriate, to the activation gases. In order to achieve a technically sufficiently high reaction rate, activation is generally carried out at relatively high temperatures, in particular in the temperature range of 700° C. to 1200° C., preferably 800° C. to 1100° C. This makes it necessary for the material of the rotary tubular kiln to satisfy high requirements as to temperature resistance.

Since the material of the rotary tubular kiln must therefore withstand both the highly corrosive conditions of the carbonization phase and the high-temperature conditions of the activation phase, only those materials are used for the production of the rotary tubular kiln which have good high-temperature corrosion resistance, that is to say, in particular steels which combine good resistance to chemically aggressive materials, in particular good corrosion resistance, and good high-temperature resistance in a single material.

Despite the high-temperature resistance of the materials, in particular steel, normally used for the rotary tube, the high operating temperatures in the production of activated charcoal, which may attain 1200° C. or even more, cause these materials or the steel to become relatively soft under these extreme temperatures and lose dimensional stability and consequently tend to a certain susceptibility with regard to mechanical deformations. In the production of activated charcoal, pressure differences and pressure fluctuations occur inherently in the method adopted: this is due particularly to the fact that, on the one hand, gaseous breakdown products are generated and, on the other hand, reaction or process gases are to be supplied and work is carried out under changing pressure conditions (for example, atmospheric pressure and reduced pressure or a vacuum), and in this case the pressure conditions cannot be kept constant for the entire duration of the method for the production of activated charcoal. The result of this, sometimes, is that the appreciable pressure differences and pressure fluctuations in the operating state may give rise to a deformation of the rotary tube. This may lead to damage to the rotary tube apparatus and to premature material fatigue, and, on the other hand, process management and process control consequently become appreciably more difficult.

One object of the present invention is, therefore, to make available an apparatus or a rotary tube which is suitable, in particular, for the production of activated charcoal, whilst the above-outlined disadvantages of the prior art are to be at least partially avoided or else at least mitigated.

To solve the problem outlined above, the present invention proposes a rotary tube according to the disclosure and claims. Further advantageous refinements are the subject-matter of the relevant subclaims.

A further subject of the present invention is a rotary tubular kiln (furnace) according to the disclosure and claims which comprise a rotary tube according to the present invention.

Finally, a further subject of the present invention is the use of the rotary tube or rotary tubular kiln according to the invention for the production of activated charcoal according to the disclosure and claims.

The subject of the present invention, according to a first aspect of the present invention, is therefore a rotary tube, in particular for a rotary tubular kiln for the production of activated charcoal, the rotary tube being provided on the outside with at least one reinforcing element for stabilizing the rotary tube in the operating state. A rotary tube with reinforcing elements is thus provided, which is dimensionally stable in the operating state, in particular under extreme temperature conditions, and has high resistance to deformations.

This is because the applicant surprisingly discovered that the mechanical stability or dimensional stability of the rotary tube can be considerably improved in the operating state, in particular even under extreme conditions (such as occur, for example, in the production of activated charcoal) when the rotary tube is provided on its outside or outer wall with at least one reinforcing element, preferably with a plurality of reinforcing elements.

A rotary tube is thereby provided which can better withstand mechanical deformations and is more resistant even to pronounced pressure differences and pressure fluctuations and is therefore dimensionally stable even under operating conditions. The rotary tube according to the invention consequently has an improved useful life with a reduced tendency to premature material fatigue. As a result of this, too, process management and process control are facilitated.

Further advantages, properties, aspects, particularities and features of the present invention may be gathered from the following description of the preferred exemplary embodiment illustrated in the drawings.

BRIEF SUMMARY OF THE INVENTION

A rotary tube for a rotary tubular kiln for the production of activated charcoal is disclosed, wherein the rotary tube is provided on the outside with at least one reinforcing element for stabilizing the rotary tube in the operating state.

One object of the present invention is to provide an improvement to rotary tubular kilns for the production of activated charcoal.

Related objects and advantages of the present invention will be apparent from the following description.

DETAILED DESCRIPTION OF THE INVENTION

Figure 1:
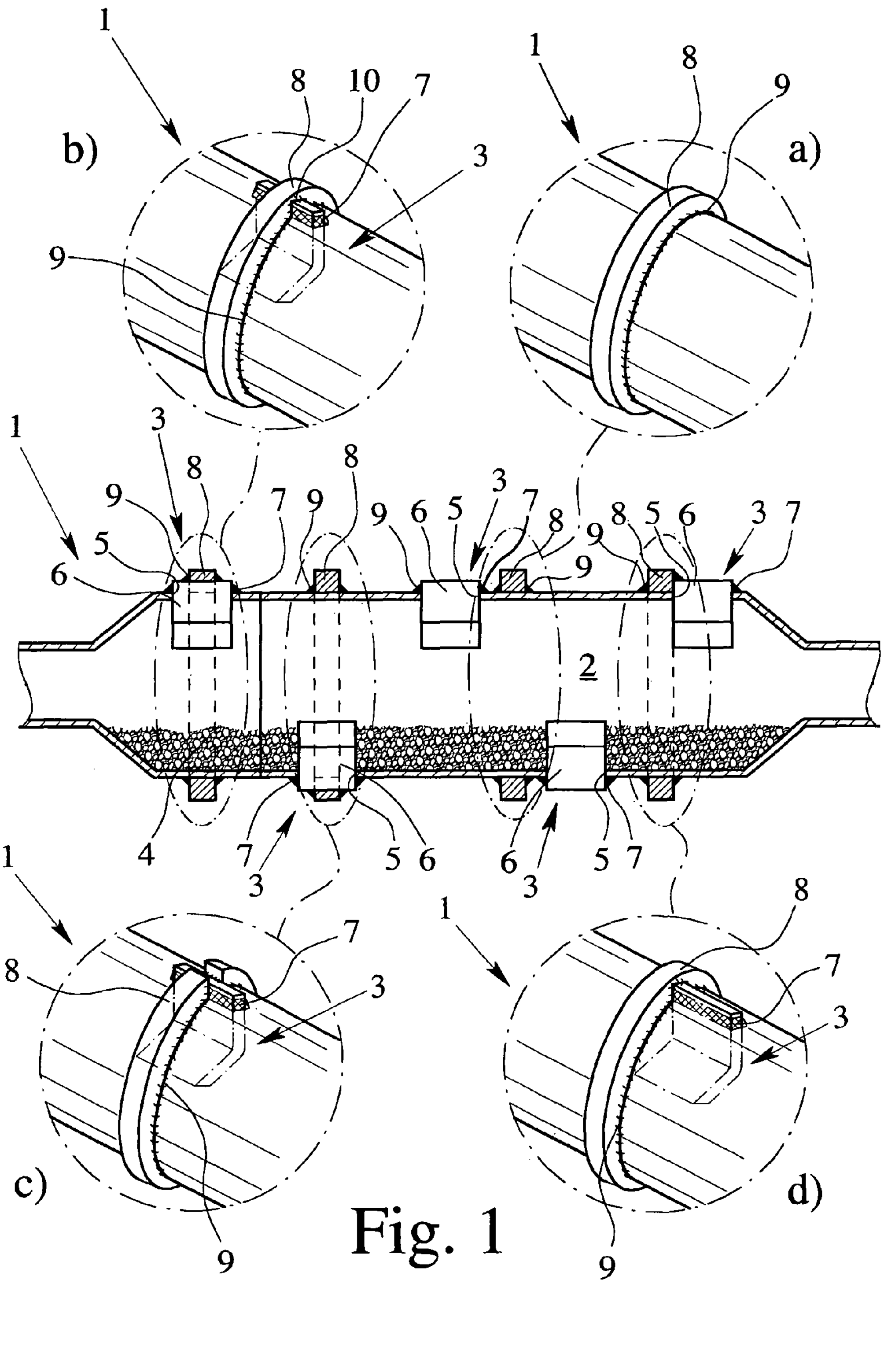
FIG. 1 shows a diagrammatic side view of a rotary tubular kiln according to a preferred exemplary embodiment of the present invention in section (FIG. 1) and also details a), b), c) and d) of variously designed refinements of the reinforcing elements which are preferred according to the invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2B:
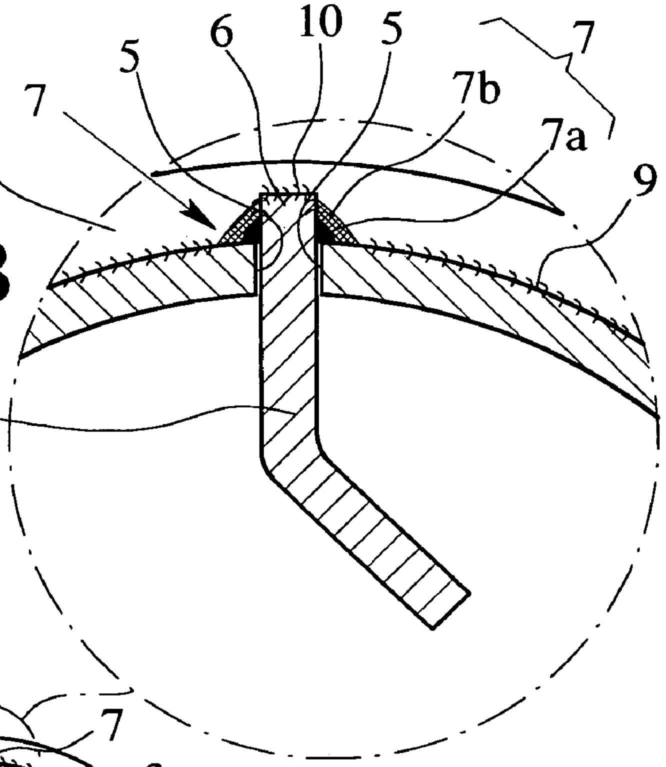
FIG. 2B shows an enlarged detail of the region identified in FIG. 2A.
Figure 2A:
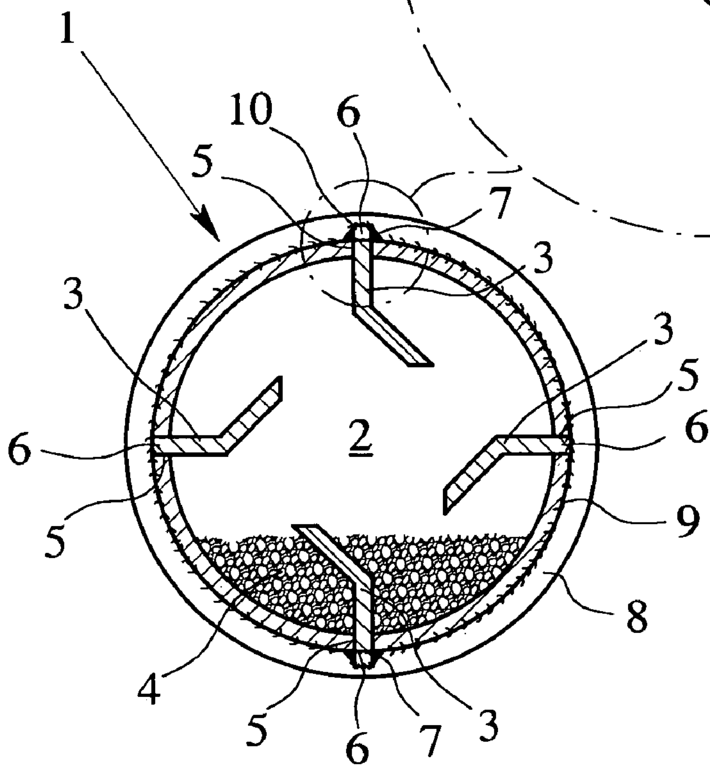
FIG. 2A shows a radial cross section through the rotary tube.

FIGS. 1, 2A, 2B and also 3A to 3C show a rotary tube 1 according to the present invention, which can be used in a rotary tubular kiln for the production of activated charcoal. As can be gathered from the figures, the rotary tube 1 according to the invention is provided on the outside with at least one reinforcing element 8 for stabilizing the rotary tube 1 in the operating state.

As may also be gathered from FIGS. 1, 2A, 2B and also 3A to 3C, mixing elements 3 for the circulation or intermixing of the batch 4 located in the inner space 2 of the rotary tube 1 may be arranged in the inner space 2 of the rotary tube 1. According to the invention, the mixing elements 3 may be, for example, circulating or reversing plates which are also designated synonymously as material guide plates. The rotary tube 1 may have perforations 5 which serve for receiving fastening portions 6 of the mixing elements 3. The fastening portions 6 of the mixing elements 3 are preferably welded to the rotary tube 1 on the outside. In other words, according to the invention, there may be provision for the mixing elements 3 to penetrate radially through the rotary tube 1 and to be welded to the rotary tube 1, in particular, externally or on the outside.

The rotary tube 1 as such may be designed, in particular, in the same way as described in DE 10 2004 036 109.6 of Jul. 24, 2004, the entire disclosure content of which is hereby included by reference.

As regards the reinforcing element 8, this serves for the mechanical stabilization of the rotary tube 1, particularly when the latter is exposed in the operating state to high temperatures and pronounced pressure fluctuations or pressure differences. Thus, by the rotary tube 1 being equipped according to the invention with at least one reinforcing element 8, a significantly improved dimensional stability or resistance of the rotary tube 1 to deformations, particularly in the operating state, as compared with the prior art, is ensured.

The reinforcing element 8 may be designed in such a way that the rotary tube 1 is stabilized in its cross section and/or in its longitudinal extent. As can be seen in FIG. 1 and also 2A and 2B, the reinforcing element 8 may extend peripherally around the rotary tube 1. In this case, the reinforcing element 8 may extend, for example, perpendicularly or at an inclination with respect to the axis of rotation of the rotary tube 1, with the result that a reinforcement or stabilization of the cross section of the rotary tube 1 is implemented. As regards the term "peripherally", this relates to a circumferential arrangement of the reinforcing element 8 on the outside or outer wall of the rotary tube 1.

As regards the arrangement of the reinforcing element 8, in an embodiment preferred according to the invention this is arranged coaxially with respect to the rotary tube 1, as FIGS. 1 and 2A show. The reinforcing element 8 and the rotary tube 1 are thus arranged concentrically with respect to one another in the cross-sectional surface.

Furthermore, the enlargements in details a) to d) of FIG. 1 and FIG. 2A illustrate that the reinforcing element 8 extends preferably at least essentially completely over the circumference of the rotary tube 1. It is likewise also possible, however, within the scope of the present invention, that the reinforcing element 8 extends over the circumference of the rotary tube 1 in portions, for example in a segment-like manner.

FIG. 1 and FIG. 2A show that, in an embodiment particularly preferred according to the invention, the reinforcing element 8 is of annular design. In this case, the reinforcing element 8 may be designed, for example, as an annular flange or in the manner of a hollow cylinder. In order to ensure that the reinforcing element 8 bears closely against the outer wall of the rotary tube 1 so as to stabilize the latter, the inside diameter of the reinforcing element 8 should in this case correspond at least essentially to the outer diameter of the rotary tube 1.

The present invention is not restricted to an annular or hollow-cylindrical design of the reinforcing element 8. Thus, for example, there may also be provision for the reinforcing element 8 to have a rib-like or helical design. In the case of a helical design of the reinforcing element 8, the reinforcing element 8 extends as it were in the manner of a helix around the circumference of the rotary tube 1 in the longitudinal direction of the latter; even in this embodiment, not illustrated in the figures, the reinforcing element 8 and the rotary tube 1 may run or be arranged coaxially with respect to one another.

In a further embodiment according to the invention, the reinforcing element 8 may extend axially along the rotary tube 1, as a result of which, in particular, a stabilization of the rotary tube 1 in its longitudinal extent is achieved. In this case, the reinforcing element 8 may extend, in particular, over the entire length of the rotary tube 1. As regards the axial arrangement of the reinforcing element 8, in this embodiment, not illustrated in the figures, the reinforcing element 8 may be arranged, for example, parallel to the axis of rotation or longitudinal axis of the rotary tube 1 on the outer wall of the latter.

Figures 3A, 3B, 3C:
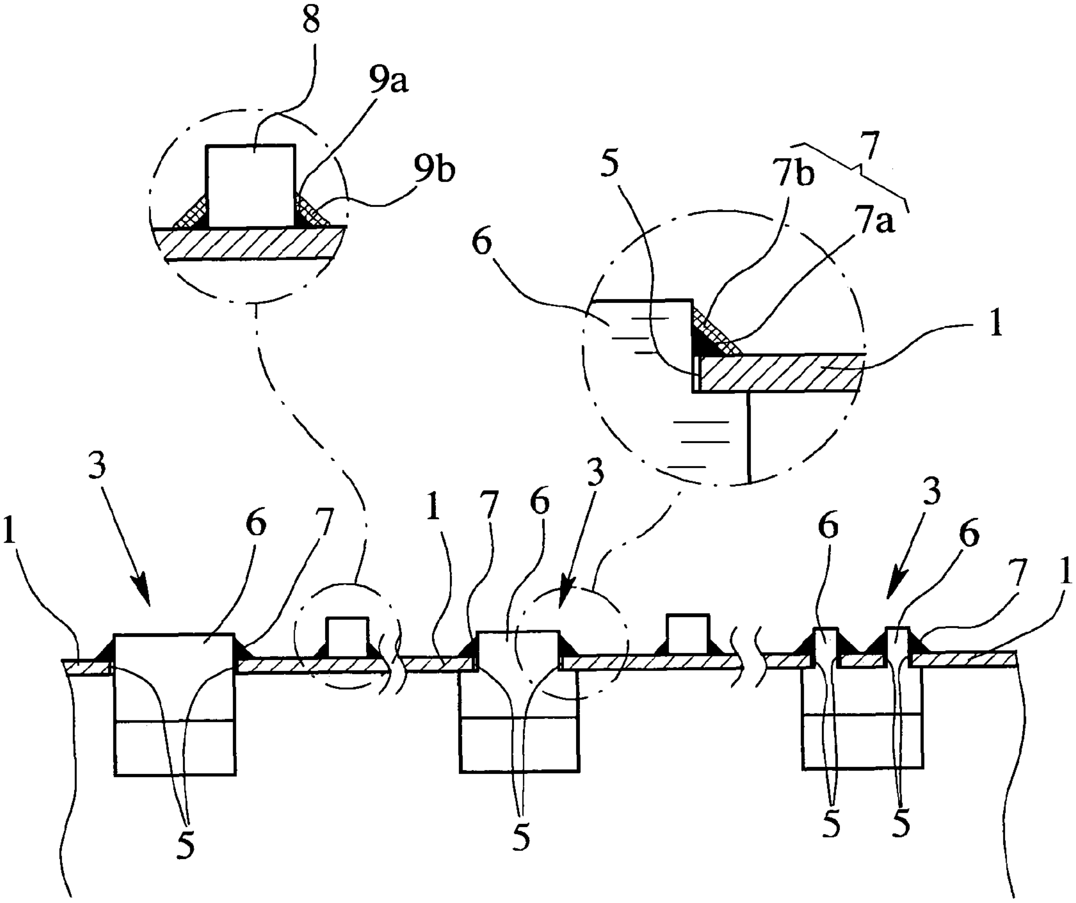
FIGS. 3A-C show a diagrammatic illustration of profiles of mixing elements with differently designed fastening portions and also a diagrammatic illustration of the reinforcing elements.

As FIG. 1 and also FIGS. 3A, 3B and 3C show, the reinforcing element 8 as such has, for example, an at least essentially rectangular cross section, the cross section of the reinforcing element 8 relating to the sectional surface according to a section in the radial plane of the reinforcing element 8. The height or width of the cross section of the reinforcing element 8 may vary within broad limits. Preferably according to the invention, the height and width of the cross section of the reinforcing element 8 may amount, for example, to 0.5 cm to 10 cm, preferably 0.5 cm to 8 cm, preferably 1 cm to 6 cm, particularly preferably 1 cm to 5 cm. According to the invention, the cross section may, for example, be of square design, but it is likewise possible and preferred according to the invention that the height and the width of the cross section of the reinforcing element 8 are different. In this case, it is preferable that the height of the cross section of the reinforcing element 8 is greater than its width. According to the invention, however, it is also basically possible that the cross section of the reinforcing element 8 is of at least essentially circular or round design, for example in the manner of a circularly closed steel wire.

Preferably according to the invention, the reinforcing element 8 is welded to the rotary tube 1 via a welded joint 9, as may be seen in FIGS. 1, 2A, 2B and also 3A to 3C. A permanent connection is thereby made between the reinforcing element 8, on the one hand, and the rotary tube 1, on the other hand. In an embodiment preferred according to the invention, the welded joint 9 runs, free of interruption, along a contact line of the reinforcing element 8 with the rotary tube 1, as can be seen particularly in the enlargements in details a) to d) according to FIG. 1 and in FIG. 2A. Alternatively, however, a portional or segment-like welded joint 9 of the reinforcing element 8 with the rotary tube 1 or a spot-like form of the welded joint 9 is also possible for the permanent fastening of the reinforcing element 8 to the rotary tube 1.

According to the invention, there may be provision for the welded joint 9 to have at least two weld layers 9*a*, 9*b*, as can be seen in FIG. 2B and in the enlargement of the detail according to FIG. 3A. This gives rise, as it were, to a double welded joint 9 with weld layers 9*a*, 9*b*. Different materials may be used for the various weld layers 9*a*, 9*b*. For embodiments related to this, reference may be made to the following embodiments regarding the welding of the fastening portions 6 of the mixing elements 3 to the rotary tube 1.

Further types of connection between the reinforcing element 8, on the one hand, and the rotary tube 1, on the other hand, are sufficiently known to a person skilled in the art; in this respect, for example, screwing, riveting and the like may be mentioned. According to the invention, however, that connection between the reinforcing element 8 and the rotary tube 1 which does not pierce the casing of the rotary tube 1 is preferred.

As can be seen in FIG. 1, the rotary tube 1 may have a plurality of reinforcing elements 8. In this case, the number of reinforcing elements 8 may amount, in particular, to two to ten, preferably two to eight, particularly preferably three to six. In this case, it is preferred according to the invention that the reinforcing elements 8 are uniformly spaced apart or equidistant from one another. In so far as is required in terms of the application or because of the individual case, a non-uniform spacing of the reinforcing elements 8 may likewise be provided: thus, for example, where portions of the rotary tube 1 which are subjected to particularly high stress are concerned, a larger number of reinforcing elements 8 per unit length of the rotary tube 1 may be fastened.

The reinforcing element 8 may consist of metal, preferably steel. Preferably according to the invention, the reinforcing element 8 may consist of the same material as the rotary tube 1. The reinforcing element 8 or the rotary tube 1 may consist particularly preferably of steel resistant to high temperature. On account of the identical material, the reinforcing element 8 and the rotary tube 1 have at least essentially identical coefficients of expansion, so that, in the operating state, that is to say at very high temperatures, no additional material stresses due to a different expansion behaviour of the reinforcing element 8, on the one hand, and of the rotary tube 1, on the other hand, occur. Moreover, the compactibility of the welded joint is thereby improved.

Furthermore, according to the invention, there may be provision for the reinforcing element 8 to be designed as a cooling element or cooling body for the optimized temperature control or for the improvement in the cooling behaviour of the rotary tube 1. According to this embodiment, the reinforcing element 8 may additionally be provided with cooling ribs which, on account of the surface enlargement, lead to a better heat discharge behaviour of the reinforcing element 8 and consequently of the rotary tube 1.

As stated above and as illustrated in FIGS. 1, 2A, 2B and also 3A to 3C, mixing elements 3, for example reversing plates, for the circulation or intermixing of the batch 4 may be arranged in the inner space 2 of the rotary tube 1. In this case, the mixing elements 3 may penetrate the rotary tube 1 radially and, in particular, be welded to the rotary tube 1 on the outside. For this purpose, the rotary tube 1 may have perforations 5 for receiving fastening portions 6 of the mixing elements 3, in which the fastening portions 6 may be welded to the rotary tube 1 on the outside.

As the enlargements in detail a) to d) in FIG. 1 illustrate, reinforcing elements 8 may be arranged on the rotary tube 1 in various ways.

Thus, it may be gathered from the enlargement in detail a) in FIG. 1 that the reinforcing element 8 is annular and surrounds or frames the rotary tube 1 over the entire circumference, whilst it is not in contact with the optionally provided mixing elements 3 or their fastening portions 6.

The enlargements in detail b) to d) of FIG. 1 show embodiments according to the invention whereby the reinforcing element 8 is connected to at least one fastening portion 6 on the outside or is in contact with the fastening portion 6. The connection in the reinforcing element 8 to the fastening portion 6 may in this case take place preferably by means of a welded joint which may be a continuation of the welded joint 9.

The outside connection of the reinforcing element 8 to at least one fastening portion 6, in particular their welding together, may take place by virtue of the arrangement according to the invention of the mixing elements 3 or their fastening portions 6: the fastening portions 6 of the mixing elements 3 project from the rotary tube 1 on the outside. Within the scope of the present invention, care must be taken to ensure that the welding of the fastening portions 6 to the rotary tube 1 is of gas-tight form in order to ensure a satisfactory function of the rotary tube 1.

Furthermore, the enlargements in detail b) to d) of FIG. 1 illustrate the different possibilities for the arrangement of the reinforcing element 8 with respect to the mixing element 3 or its fastening portion 6:

Thus, the enlargement in detail b) of FIG. 1 shows an arrangement whereby the fastening portion 6 extends on both sides, as it were, perpendicularly with respect to the reinforcing element 8, and the reinforcing element 8 is thus arranged, for example, at least essentially centrally with respect to the fastening portion 6 extending in the direction of the axis of rotation or longitudinal axis of the rotary tube 1 or, as it were, "crosses" the fastening portion 6. In order to ensure that the inner surface of the reinforcing element 8 bears against the outside of the rotary tube 1 in a flat manner, according to this embodiment the reinforcing element 8 may have at least one clearance 10 for receiving the fastening portion 6. The reinforcing element 8 according to the invention may be permanently connected, in the region of the clearance 10, to the fastening portion 6, for example by means of a weld.

According to the enlargement in detail c) of FIG. 1, an embodiment according to the invention can be seen whereby the reinforcing element 8 has an interruption or perforation in the region of the fastening portion 6. In this case, the cross sections of the reinforcing element 8 bear, as it were, flush against the longitudinal side of the fastening portion 6. In this embodiment, too, a welding of the contact surfaces of the reinforcing element 8, on the one hand, and of the fastening portion 6, on the other hand, may be provided.

Finally, the enlargement in detail d) of FIG. 1 shows a further arrangement according to the invention of the reinforcing element 8 on the rotary tube 1, whereby the annularly designed reinforcing element 8 bears with its side wall against the short side of the fastening portion 6 of a mixing element 3. In this case, there may be provision for the reinforcing element 8 to be welded to the fastening portion 6 in the region of the contact point. According to this embodiment, too, if appropriate, a clearance in the reinforcing element 8 may be provided (not illustrated).

The fastening, provided if appropriate, of the reinforcing element 8 to the fastening portions 6 of the mixing elements 3 results in an additional stabilization of the rotary tube 1, since the respective elements—reinforcing element 8, on the one hand, and fastening portion 6 or mixing element 3, on the other hand,—as it were engage one in the other and thus, at it were, additionally stabilize one another. As a result, in particular, a stabilization of the mixing elements 3 subjected to high mechanical stress is also achieved, thereby ensuring an additional prolongation of the useful life of the apparatus.

As illustrated in FIG. 2A, the reinforcing element 8 may also be connected to a plurality of mixing elements 3 or their fastening portions 6. Thus, according to FIG. 2A, the reinforcing element 8 is connected to the mixing elements 3 lying at the top and bottom in the cross-sectional surface, whilst the laterally arranged mixing elements 3 lie behind the reinforcing element 8 in the plane of projection.

The present invention also covers those embodiments whereby at least one, in particular, annular reinforcing element 8 is connected to a plurality of mixing elements 3 or their fastening portions 6, so that the reinforcing element 8 is otherwise spaced apart from the rotary tube 1 and is therefore fixed, as it were, only at the mixing elements 3.

In an embodiment particularly preferred according to the invention, the rotary tube 1 has a plurality of, for example at least two, preferably three to six, annular reinforcing elements 8, in particular consisting of steel preferably resistant to high temperature, the reinforcing elements 8 extending peripherally around the rotary tube 1 and/or perpendicularly with respect to the axis of rotation of the rotary tube 1. In this case, the reinforcing elements 8 are arranged along the longitudinal extent of the rotary tube 1 and are spaced apart preferably uniformly from one another. According to this particularly preferred embodiment, the reinforcing elements 8 are welded to the rotary tube 1 on the outside via a welded joint 9. The rotary tube 1 is thus reinforced for mechanical stabilization, particularly in the event of pressure fluctuations, by reinforcing elements 8 welded to the rotary tube 1 on the outside, for example in the manner of steel rings or steel bands. The reinforcing elements 8 in the form of steel rings or steel bands may, as it were, "cross" the mixing elements 3 or the fastening portions 6; the steel rings or steel bands may have clearances at these "crossing regions", as they are known.

As regards the mixing elements 3 provided according to a preferred embodiment, these are located in the inner space 2 of the rotary tube 1 and are advantageously arranged so as to be distributed over the inner space 2 of the rotary tube 1, so that an optimum circulation or intermixing of the batch 4 in the operating state is ensured. The mixing elements 3 may be permanently connected to the rotary tube 1 via their fastening portions 6 by being welded on the outside. The fastening portions 6 of the mixing elements 3 are as it were inserted through the perforations 5 located in the wall of the rotary tube 1 and project or protrude a little, in particular on the outside, so that an outside welding of the fastening portions 6 of the mixing elements 3 to the rotary tube 1 (that is to say, to the outer wall of the rotary tube 1) or to the reinforcing element 8 becomes possible.

Forming the weld 7 of the mixing elements 3 on the outside is associated with a series of advantages: on the one hand, the outside welding avoids a situation where the welding point or weld seam is exposed to the aggressive conditions prevailing in the interior 2 of the rotary tube 1 in the operating state during the production of activated charcoal-corrosive acid gases and high temperatures. Moreover, by the weld being formed on the outside, it is possible to maintain or check and, if required, rectify or repair this readily from the outside, even in the operating state. Finally, optimum welding materials may thereby be used, which ensure a good and reliable permanent connection of mixing elements 3/rotary tube 1 or mixing elements 3/reinforcing elements 8, that would not otherwise readily withstand permanently the corrosive high-temperature conditions in the interior 2 of the rotary tube 1 which prevail during operation.

As is evident from FIG. 1 and particularly from FIGS. 2A and 2B, the outside welding of the fastening portions 6 of the mixing elements 3 to the rotary tube 1 takes place via a welding portion 7. This welding portion 7 advantageously has at least two weld layers or two weld seams 7*a*, 7*b*. The two weld layers or weld seams 7*a*, 7*b* are advantageously arranged or applied one above the other. This gives rise to double weld layers or weld seams 7*a*, 7*b*. The advantage of this is that different materials can be used for the various weld layers 7*a*, 7*b*. For example, welding materials having different temperature and corrosion resistance can thereby be used or combined with one another, in which case the inner weld layer 7*a* should advantageously be resistant to corrosion and to high temperature, whilst corrosion resistance is not required to the same extent in the outer weld layer 7*b*. By a plurality of weld layers or weld seams 7*a*, 7*b* being used, a leak-tight, in particular gas-tight, and reliable welding of the connecting portions 6 of the mixing elements 3 to the rotary tube 1 is achieved. According to a particular embodiment of the present invention, one of the two weld layers 7*a*, 7*b* is an austenitic, in particular fully austenitic form and the other is of ferritic/austenitic form. Particularly preferably, the inner weld layer 7*a* is an austenitic, in particular fully austenitic form and the outer weld layer 7*b* is a ferritic/austenitic form. According to a preferred embodiment, welding takes place by build-up welding (for example, by electrode welding). In general, welding takes place in such a way that the welding portion 7 is of at least essentially gas-tight form.

In general, the fastening portions 6 of the mixing elements 3 are designed in such a way that they project on the outside. In other words, the fastening portions 6 project beyond the outer wall of the rotary tube 1, thus allowing good weldability and good anchoring of the fastening portions 6.

The perforations 5 in the wall of the rotary tube 1, which serve for receiving the fastening portions 6 of the mixing elements 3, are generally of slit-like design. The fastening portions 6 of the mixing elements 3 can then be inserted through these, in particular, slit-like perforations 5, advantageously such that the fastening portions 6 project, that is to say stand off a little from the outer casing of the rotary tube, so that they can be welded more effectively. This is evident in FIGS. 2A and 2B.

As regards the fastening portions 6 of the mixing elements 3, various refinements are possible in order to ensure a reliable connection of the fastening portions 6 to the rotary tube 1: some of these are illustrated in FIGS. 3A to 3C. There is, for example, the possibility that the fastening portions 6 of the mixing elements 3 extend over the entire bearing or circumferential length of the mixing elements 3; in this case, the fastening portions 6 are inserted completely through the perforations 5 in the wall of the rotary tubular kiln 1, and such an embodiment is illustrated in FIG. 3A. Alternatively, there is the possibility that the fastening portions 6 are shorter than the bearing or circumferential length of the mixing elements 3; such embodiments are illustrated in FIGS. 3B and 3C. In the last-mentioned instances according to FIGS. 3B and 3C, the mixing elements 3 may have, for example, a shoulder at the transition to the fastening portion 6, the said shoulder serving, in particular, for bearing against the inside or inner wall of the rotary tube 1. There is also the possibility that the mixing elements 3 have in each case a plurality of fastening portions 6 engaging into different perforations 5, as illustrated, for example, in FIG. 3C.

As regards the mixing elements 3, these may be, for example, of blade-like or plate-like design, in order to ensure a reliable and intensive intermixing and circulation of the batch 4. According to one embodiment, the mixing elements run at least essentially in the radial direction of the rotary tube 1, thus ensuring a particularly intensive intermixing of the batch 4. The mixing elements 3 used may be, for example, metal sheets, in particular angled sheets (angle sheets), which intermix the batch 4 in the manner of a blade. This is known as such to a person skilled in the art.

As regards the rotary tube 1, the mixing elements 3 and the reinforcing element 8, these advantageously consist of material resistant to high temperature and to corrosion, in particular steel. This is because both the rotary tube 1 and the mixing elements 3 must withstand the extremely corrosive conditions of the carbonization phase and the high-temperature conditions of the activation phase during the production of activated charcoal. Examples of suitable steels resistant to high temperature and to corrosion, from which the rotary tube 1 and/or the mixing elements 3 and/or the reinforcing element or reinforcing elements 8 can be produced, are high-alloy steels, that is to say steels with more than 5% alloying elements. Examples of these are high-alloy chromium steels and chromium/nickel steels, preferably with a chromium and/or nickel fraction of more than 10%, in particular more than 15%, particularly preferably more than 20%, with respect to the alloy. Ferritic or ferritic/austenitic steels with good corrosion and high-temperature behaviour are preferably used as material for the production of the rotary tube 1 and/or of the mixing elements 3 and/or of the reinforcing element or reinforcing elements 8.

Furthermore, the rotary tube 1 according to the invention advantageously has inlet and outlet devices for the introduction and discharge and also conduction of gases, for example for the introduction of inert gases for the carbonization phase in the production of activated charcoal and for the introduction of oxidation gases for the activation phase in the production of activated charcoal. This is not illustrated in the figures.

For improved maintenance of the inner space 2 of the rotary tube 1, the latter may have, in the wall of the rotary tube, what is known as a manhole which can be closed, leak-tight, by means of the rotary tube 1 and thus allows maintenance personnel to climb into the inner space 2 of the rotary tube 1 when the latter is not in operation. This is likewise not illustrated in the figures. Maintenance even of the inner space 2 of the rotary tube 1 is thereby ensured in a simple way.

As described above, according to the present invention, the rotary tube 1 is used particularly in rotary tubular kilns for the production of activated charcoal. The subject of the present invention, according to a second aspect of the present invention, is therefore a rotary tubular kiln which has the above-described rotary tube 1 according to the present invention.

A further subject of the present invention, according to a third aspect of the invention, is the use of a rotary tube 1, as described above, or of a rotary tubular kiln containing this rotary tube 1 for the production of activated charcoal. As described in the introduction part of the present invention, the production of activated charcoal takes place generally by the carbonization (also designated synonymously as pyrolysis, smouldering or coking) and subsequent activation of carbon-containing starting materials, in particular organic polymers, such as, for example, sulphonated organic polymers (for example, sulphonated polystyrenes cross-linked with divinylbenzene) which are carbonized and subsequently activated in the rotary tube or rotary tubular kiln according to the present invention. In this context, carbonization is generally carried out at temperatures of 100° C. to 750° C., in particular 150° C. to 650° C., preferably 200° C. to 600° C., preferably under an inert or at most slightly oxidizing atmosphere, as described in the introductory part. In this case, carbonization may also be preceded by a pre-carbonization or pre-smouldering step. By contrast, activation is generally carried out at temperatures of 700° C. to 1200° C., in particular 800° C. to 1100° C., preferably 850° C. to 1000° C. As described in the introductory part, carbonization is generally carried out under controlledly or selectively oxidizing conditions, in particular under a controlledly oxidizing atmosphere. As suitable starting polymers of the abovementioned type, mention may be made, in particular, of ion exchanger resins (for example, cation exchanger resins or acid ion exchanger resins, preferably with sulphonic acid groups, such as, for example, cation exchanger resins based on sulphonated styrene/divinylbenzene copolymers) or their precursors (that is to say, the unsulphonated ion exchanger resins which still have to be sulphonated by means of a suitable sulphonating agent, such as, for example, sulphuric acid and/or fuming sulphuric acid, before or during carbonization). For further details in this regard, reference may be made to the statements made above in the introductory part.

Mounting the reinforcing element or reinforcing elements on the outside has the effect that the mechanical stability or dimensional stability of the rotary tube is improved considerably in the operating state, in particular even under extreme conditions (such as occur, for example, in the production of activated charcoal). A rotary tube is thereby provided, which can better withstand mechanical deformations and is more resistant even to pronounced pressure differences and pressure fluctuations and is therefore dimensionally stable even under operating conditions. The rotary tube according to the invention consequently has an improved useful life with a reduced tendency to premature material fatigue. Process management and process control are also consequently facilitated.

The rotary tube or rotary tubular kiln according to the present invention makes it possible to produce activated charcoal, starting from suitable carbon-containing starting materials, by carbonization and subsequent activation in a single apparatus, with relatively easy handling. By the mixing elements being welded on the outside, a system is provided which is easy to maintain and requires little repair and which is suitable for withstanding both the extremely corrosive conditions of the carbonization phase and the high-temperature conditions of the activation phase; welding the mixing elements on the outside makes it possible to use welding materials (=weld materials or weld metal) which are optimally suitable for welding, but could not readily be used for inside welding, since they would not readily permanently withstand the corrosive high-temperature conditions in the interior of the rotary tubular kiln during the operating state.

Further advantages, refinements, modifications, variations and properties of the present invention are readily evident and understandable to a person skilled in the art from a reading of the description, without in this case departing from the scope of the present invention.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A rotary tube for use as part of a rotary tubular kiln for the production of activated charcoal, wherein said rotary tube includes an outer wall and is provided on said outer wall with a reinforcing element constructed and arranged for peripherally reinforcing the rotary tube in an operating state, the reinforcing element extending around said outer wall for substantially its entire periphery, except for a clearance gap for receiving a fastening portion of a mixing element, and being welded to the rotary tube via a welded joint, wherein the rotary tube further comprises mixing elements arranged in the inner space of the rotary tube for the circulation and/or intermixing of a batch, the mixing elements penetrating radially through the rotary tube and being welded to the outer wall, the rotary tube having perforations for receiving fastening portions of the mixing elements, the fastening portions being welded to the outer wall, and wherein the reinforcing element is connected to the fastening portion of a corresponding mixing element, which projects through the outer wall, the connection of the reinforcing element to the fastening portion being realized by means of a welded joint.

2. A rotary tube according to claim 1, wherein the reinforcing element is designed in such a way that the rotary tube is stabilized in its cross section and/or in its longitudinal extent.

3. A rotary tube according to claim 1, wherein the reinforcing element extends peripherally around the rotary tube perpendicularly or at an inclination with respect to the axis of rotation of the rotary tube.

4. A rotary tube according to claim 1, wherein the reinforcing element is arranged coaxially with respect to the rotary tube.

5. A rotary tube according to claim 1, wherein the reinforcing element extends axially along the rotary tube over the entire length of the latter.

6. A rotary tube according to claim 1, wherein the reinforcing element has an at least essentially rectangular cross section.

7. A rotary tube according to claim 1, wherein the welded joint connecting the reinforcing element to the rotary tube runs along a contact line of the reinforcing element with the rotary tube and wherein the welded joint has at least two weld layers.

8. A rotary tube according to claim 1, wherein the rotary tube has a plurality of reinforcing elements, the reinforcing elements being spaced apart uniformly from one another.

9. A rotary tube according to claim 1, wherein the reinforcing element consists of metal, the reinforcing element consisting of the same material as the rotary tube and the reinforcing element and the rotary tube consisting of steel resistant to high temperature.

10. A rotary tube according to claim 1, wherein the rotary tube has a plurality of annular reinforcing elements consisting of steel resistant to high temperature, the reinforcing elements extending peripherally around the rotary tube and/or perpendicularly with respect to the axis of rotation of the rotary tube, the reinforcing elements being arranged along the longitudinal extent of the rotary tube, and the reinforcing elements being spaced apart uniformly from one another, and the reinforcing elements being welded to the rotary tube on the outside outer wall via a welded joint.

11. A rotary tube according to claim 1, wherein the reinforcing element is designed as a cooling element or cooling body, the reinforcing element being provided with cooling ribs.

12. A rotary tube according to claim 1, wherein the mixing elements are reversing plates.

13. A rotary tube according to claim 1, wherein the reinforcing element has at least one clearance for receiving a fastening portion of a mixing element.

14. A rotary tube according to claim 1, wherein the outside welding of the fastening portions of the mixing elements to the rotary tube takes place via a welding portion, in particular the welding portion having at least two weld layers, different materials being used for the various weld layers.

15. A rotary tube according to claim 1, wherein the perforations for receiving the fastening portions of the mixing elements are of slit-like design and wherein the fastening portions of the mixing elements are inserted through the perforations.

16. A rotary tube according to claim 1, wherein the mixing elements are of blade-like or plate-like design, and/or wherein the mixing elements run at least essentially in the radial direction of the rotary tube.

17. A rotary tubular kiln, constructed and arranged for the production of activated charcoal, and including a rotary tube according to claim 1.

18. A rotary tube for use as part of a rotary tubular kiln for the production of activated charcoal, said rotary tube having an outside surface and comprising:

a plurality of circumferential reinforcing elements welded to said outside surface and being constructed and arranged for reinforcing the rotary tube, said reinforcing elements being constructed and arranged annularly and extending completely around the outside of said rotary tube; and a plurality of mixing elements positioned in an inner space defined by said rotary tube, each mixing element of said plurality of mixing elements having a fastening portion, wherein said rotary tube defines a plurality of perforations and each fastening portion extending through a corresponding perforation and being welded to a corresponding reinforcing element.

* * * * *